United States Patent [19]

Stapleton et al.

[11] Patent Number: 5,016,798

[45] Date of Patent: May 21, 1991

[54] SPACER INSERT FOR LOAD-BEARING SLATS

[75] Inventors: Craig A. Stapleton; Robert S. Zauner, both of Port Huron, Mich.

[73] Assignee: Huron/St. Clair Incorporated, Port Huron, Mich.

[21] Appl. No.: 505,340

[22] Filed: Apr. 5, 1990

[51] Int. Cl.⁵ .............................................. B60R 9/00
[52] U.S. Cl. ..................................... 224/326; 224/325
[58] Field of Search .............. 224/326, 309, 310, 317, 224/325, 917, 321, 324, 322; 248/634, 602, 580

[56] References Cited

U.S. PATENT DOCUMENTS

| | | | |
|---|---|---|---|
| 2,688,504 | 9/1954 | Parker | 224/321 |
| 3,473,773 | 10/1969 | Meyer | 224/309 |
| 4,099,658 | 7/1978 | Bott | 224/421 F |
| 4,106,680 | 8/1978 | Bott | 224/29 R |
| 4,182,471 | 1/1980 | Bott | 224/326 |
| 4,222,508 | 9/1980 | Bott | 224/324 |
| 4,239,139 | 12/1980 | Bott | 224/324 |
| 4,274,570 | 6/1981 | Bott | 224/324 |
| 4,295,587 | 10/1981 | Bott | 224/321 |
| 4,323,182 | 4/1982 | Bott | 224/321 |
| 4,364,500 | 12/1982 | Bott | 224/325 |
| 4,431,123 | 2/1984 | Bott | 224/321 |
| 4,433,804 | 2/1984 | Bott | 224/321 |
| 4,442,961 | 4/1984 | Bott | 224/42.03 |
| 4,460,116 | 7/1984 | Bott | 224/321 |
| 4,473,178 | 8/1984 | Bott | 224/324 |
| 4,487,349 | 12/1984 | Kudo | 224/322 |
| 4,501,385 | 2/1985 | Bott | 224/319 |
| 4,516,709 | 5/1985 | Bott | 224/315 |
| 4,588,117 | 5/1986 | Bott | 224/321 |
| 4,589,809 | 5/1986 | Moore et al. | 411/166 |
| 4,721,239 | 1/1988 | Gibbs, II et al. | 224/322 |
| 4,723,696 | 2/1988 | Stichweh et al. | 224/331 |

Primary Examiner—Henry J. Recla
Assistant Examiner—David J. Walczak
Attorney, Agent, or Firm—Edgar A. Zarins; Malcolm L. Sutherland

[57] ABSTRACT

A load-bearing slat for an article carrier having a spacer insert disposed between the load-bearing wall of the slat and the insulator for added support. The spacer is pre-attachable to the insulator to facilitate final assembly. The insulator includes spaced openings for receiving the insert which is locked into place whether by a snap fit or through rotation of the insert. The spacers have throughbores to permit the fasteners for the slat to pass through to the vehicle surface for attachment thereto.

6 Claims, 2 Drawing Sheets

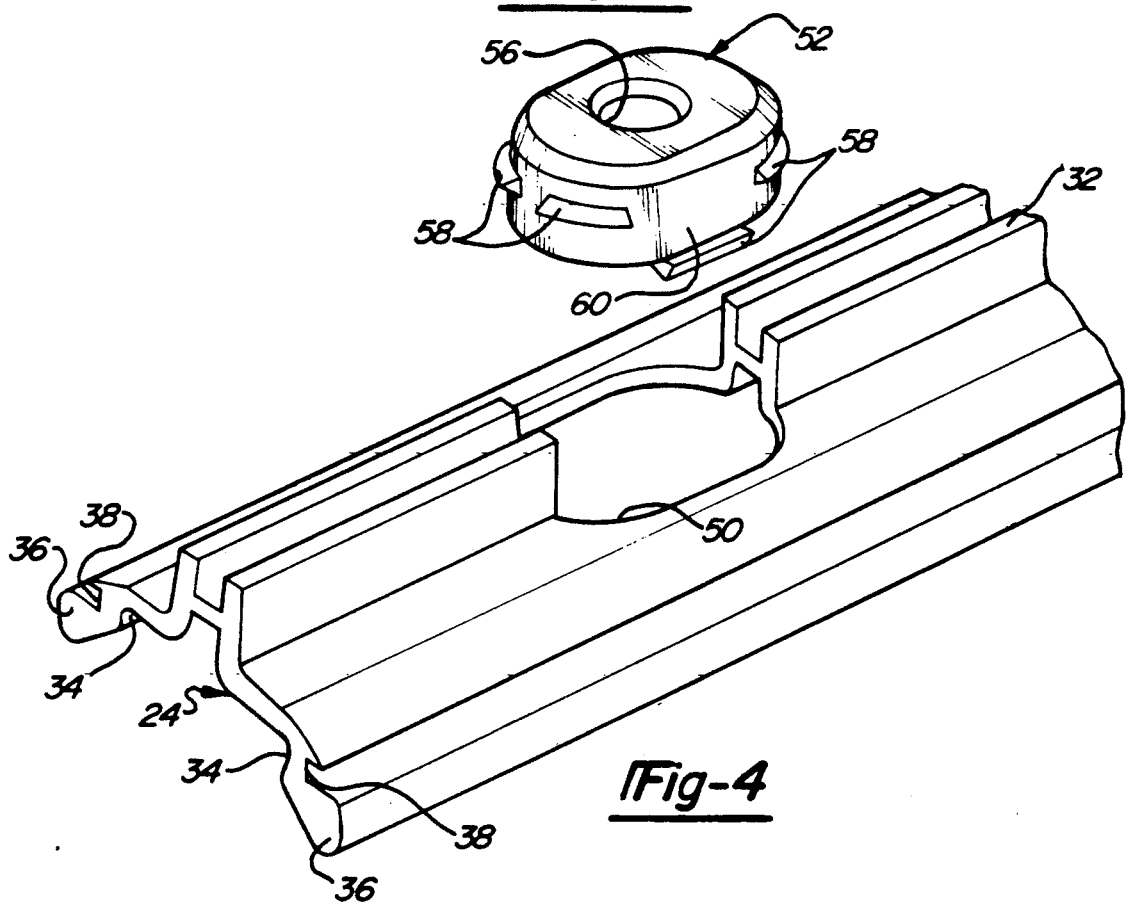

SPACER INSERT FOR LOAD-BEARING SLATS

BACKGROUND OF THE INVENTION

1. Field of the Invention

This invention relates to load-bearing slats for vehicle article carriers and, in particular, to a spacer insert attachable to the insulator of the slat for providing added support for the load-bearing wall of the slat.

2. Description of the Prior Art

Surface mounted vehicle article carriers may be provided with longitudinal slats which form a load-bearing surface of the article disposed within the carrier. Typical slats include a slat body and an underlying insulator to prevent contact between the slat body and vehicle surface. The insulator may provide the added function of support to the slat body by molding in a supporting ridge down the center of the insulator. However, such insulator configuration can be difficult to mold and add significantly to the cost of the carrier. Nevertheless, it has been found that some support for the load-bearing wall is necessary to prevent damage to the longitudinal slats under extreme loads.

SUMMARY OF THE PRESENT INVENTION

The present invention overcomes the disadvantages of the prior known slat constructions by providing a spacer insert attachable to the insulator for supporting the load-bearing wall of the slat body.

The slat construction of the present invention generally includes a slat body and an insulator to prevent contact between the slat body and the vehicle surface. The slat body is preferably formed of a lightweight metal and includes an upper load-bearing surface. The slat body may include flanged legs which cooperate with grooves formed in the insulator to secure the insulator to the slat body. Typically, the slat is secured to the vehicle surface by fasteners spaced along the length of the slat.

In order to simplify molding of the insulator, the insulator is provided with a support wall to engage the load-bearing surface of the slat body and outwardly extending legs which engage the vehicle surface and receive the flanges of the slat body. The insulator includes a plurality of detachable spacers disposed within the insulator. The spacers are received within spaced-apart openings in the insulator which may correspond to the openings for receiving the fasteners for securing the slat. The spacers include flanges which cooperate with the opening in the insulator to attach the spacer to the insulator. Attachment can be accomplished through a snap fit by depressing the spacer into the opening. It is preferred that the opening provide longitudinal freedom to compensate for manufacturing tolerances.

Other objects, features and advantages of the invention will be apparent from the following detailed description taken in connection with the accompanying drawings:

BRIEF DESCRIPTION OF THE DRAWING

The present invention will be more fully understood by reference to the following description of a preferred embodiment of the present invention when read in conjunction with the accompanying drawing, in which like reference characters refer to like parts throughout the views and in which:

FIG. 3 is a cross-sectional view of the spacer of the slat;

FIG. 4 is a partial exploded perspective of the spacer and the insulator; and

FIG. 5 is a cross-sectional view of the slat.

DETAILED DESCRIPTION OF A PREFERRED EMBODIMENT OF THE PRESENT INVENTION

Figure 1:
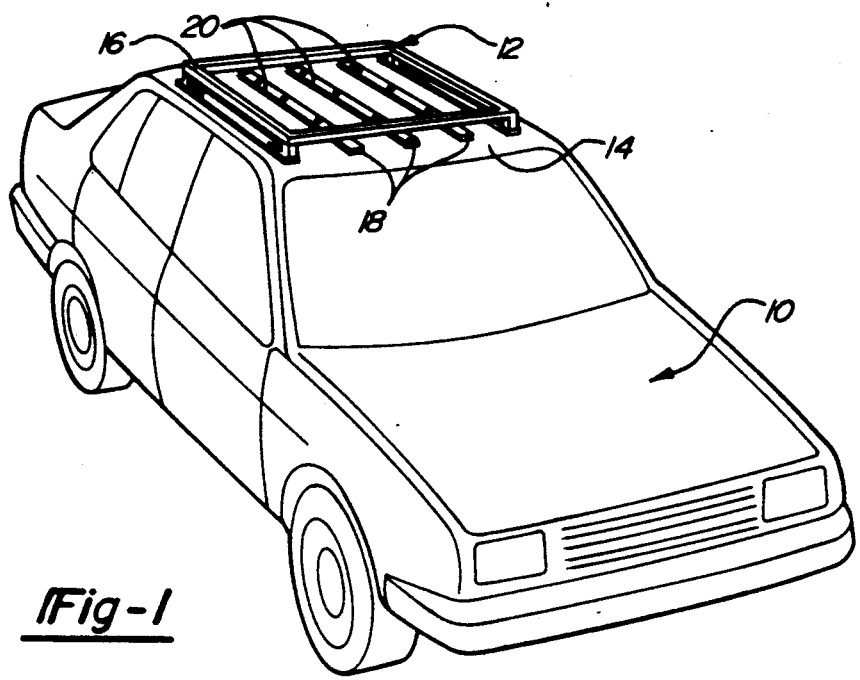
FIG. 1 is an elevated perspective of a vehicle having an article carrier incorporating the present invention mounted thereto.
Figure 2:
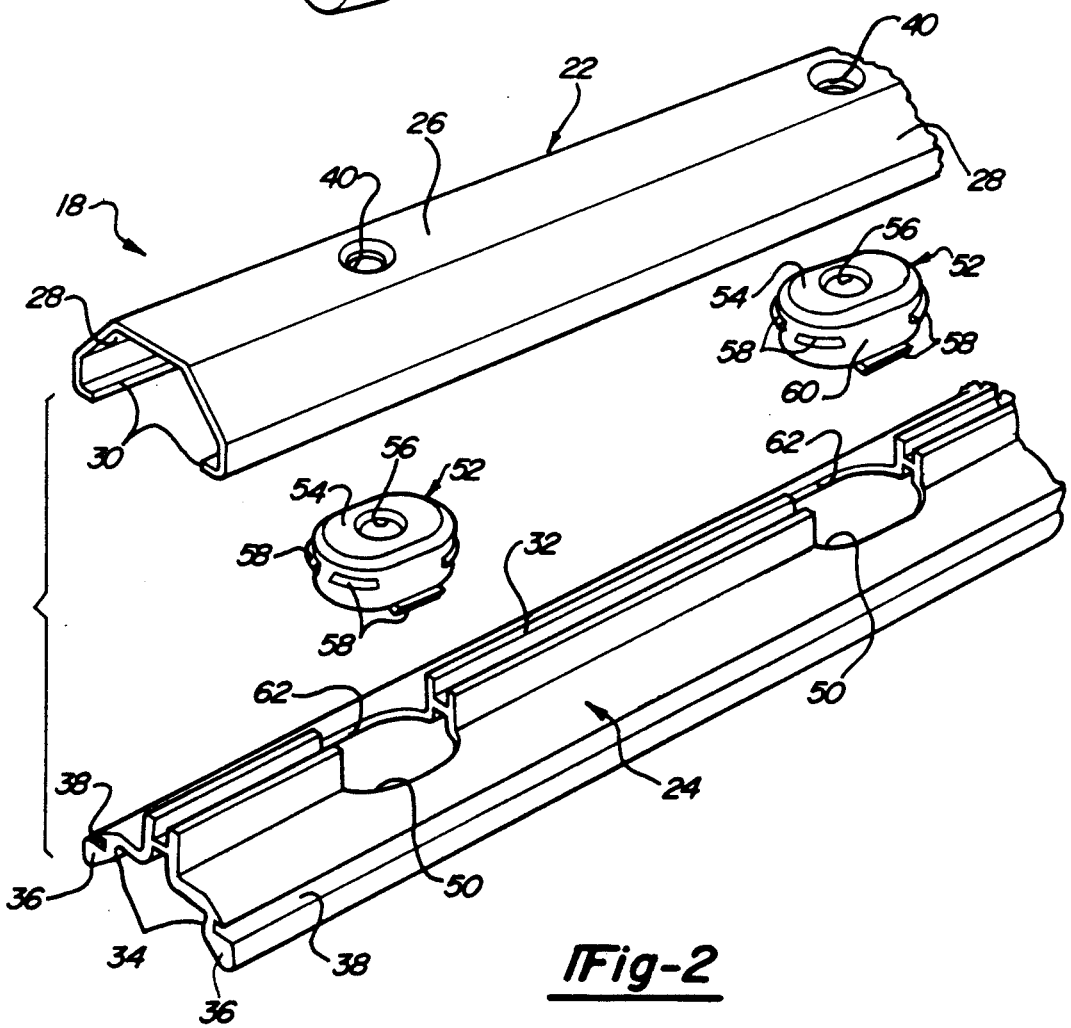
FIG. 2 is an exploded perspective of a load-bearing slat of the present invention.

Referring first to FIG. 1, there is shown a vehicle 10 having an article carrier 12 embodying the present invention mounted to the roof surface 14 thereof. Although a roof mounted carrier 12 is shown, it is to be understood that the present invention may also be utilized with deck mount carriers. The article carrier 12 generally includes a peripheral frame 16 and a plurality of longitudinally aligned, load-bearing slats 18 mounted to the vehicle surface 14. In a preferred embodiment, the slats 18 are secured with fasteners 20 extending therethrough to engage well nuts or the like (not shown) in the vehicle surface 14.

Referring now to FIGS. 2 through 5, a preferred embodiment of the longitudinal slat 18 is shown. The slat 18 generally comprises a slat body 22 attached to an insulator 24 to prevent contact with the vehicle surface. The slat body 22 is preferably extruded or roll-formed metal and includes a top load-bearing wall 26 and a pair of outwardly extending legs 28 having flanged lips 30 to facilitate attachment to the insulator 24. The insulator 24 includes a longitudinal support 32 and outwardly extending legs 34 which include pads 36 for engagement with the vehicle surface 14. Preferably formed in the outwardly extending legs 34 of the insulator 24 is a longitudinally extending groove 38 adapted to detachably receive the flanged lips 30 of the slat body 22 thereby attaching the slat body 22 to the insulator 24 for mounting to the vehicle 10 Although the slat body 22 is shown and described as being pre-attached to the insulator 24 it is to be understood that the body 22 may be merely mounted on the top of the insulator 24 during assembly of the carrier 12. Alternative attachment means may also be utilized. Apertures 40 in the top surface of the slat body 22 are adapted to receive fasteners 20 to mount the slat 18 to the vehicle surface 14.

Formed in the top surface 32 of the insulator 24 are a series of openings 50 which receive spacer inserts 52 to support the load-bearing wall 26 of the slat body 22 above the insulator 24. The spacer 52 is lockingly received within the opening 50 and an upper surface 54 which engages the load-bearing wall 26 of the slat body 22. In a preferred embodiment, the spacers 52 and openings 50 are aligned with the fastener aligned 40 of the slat body such that the fastener 20 will pass the aperture 40 and through a bore 56 in the space 52 to engage the vehicle surface 14. Preferably, the throughbore 56 is chamferred to correspond to the chamferred aperture 40 of the slat body 22.

The first embodiment of the spacer insert 52 includes staggered flanges 58 on opposite sides of the spacer 52 of which form a space or groove therebetween. The groove 60 formed by the flanges 58 is adapted to receive the edges 62 of the opening 50 in the insulator 24 to lockingly position the spacer 52 within the insulator 24. To pre-assemble the spacer 52 to the insulator 24, the spacer 52 is positioned over the opening 50 and pressed into place. As the spacer 52 is depressed the edges 62 will bend to allow the bottom flanges 58 to move past the surface 32 of the insulator 24 positioning the edge of the opening 50 within the groove 60 between the sets of flanges 58. Preferably, the longitudinal dimension of the opening 50 is greater than the corresponding dimension of the spacer 52 to provide some play within the opening 50 to facilitate positioning the fastener 20 through the spacer 52.

Thus, the present invention provides a spacer insert for attachment to the underlying insulator to support the load-bearing wall of the slat. As a result molding of the insulator is simplified and the spacer can be pre-attached to the insulator to facilitate final assembly and mounting to the vehicle.

The foregoing detailed description has been given for clearness of understanding only and no unnecessary limitations should be understood therefrom as some modifications will be obvious to those skilled in the art without departing from the scope and spirit of the appended claims.

I claim:

1. A load-bearing slat for an article carrier adapted to be mounted to an exterior surface of a vehicle, said slat comprising:

a slat body having a load-bearing wall;

an insulator having a top surface, said slat body engaging said insulator to prevent contact between said slat body and the vehicle surface;

at least one spacer insert attachable to said top surface of said insulator and engaging said load-bearing wall of said slat body to support said load-bearing wall of the slat; said insulator includes at least one opening formed in said top surface for receiving said at least one spacer insert, said at least one spacer insert lockingly seated within said at least one opening; and said at least one spacer insert includes vertically spaced peripheral flanges forming a groove therebetween for lockingly seating said at least one spacer within said insulator, said peripheral flanges engaging an edge of said at least one opening in said insulator to prevent vertical displacement of said at least one spacer insert within said corresponding opening.

2. The slat as defined in claim 1 wherein said at least one spacer insert includes an axial throughbore to receive fastening means of said slat, said throughbore of said at least one spacer insert communicating with apertures formed in said load-bearing wall of said slat body such that fastening means passes through said aperture and said spacer inserted within said insulator to secure said slat to the vehicle surface.

3. In a load-bearing slat for a vehicle luggage carrier having a slat body with a load-bearing wall, an insulator for preventing contact between the slat body and the vehicle, and means for fastening the slat to the vehicle, the improvement comprising:

a spacer insert received within an opening in a top surface of the insulator, said spacer insert maintaining the spaced apart relationship of the load-bearing, wall of the slat body and the top surface of the insulator thereby supporting the load-bearing wall of the slat body; and said spacer insert includes vertically spaced locking flanges forming a groove therebetween for lockingly seating said spacer insert within said opening of the insulator, said locking flanges lockingly receiving an edge of said insulator opening to retain said spacer insert.

4. The improved slat as defined in claim 3 wherein the insulator includes a plurality of said openings longitudinally spaced along the insulator, each of said openings lockingly receiving a spacer insert to support the load-bearing wall of the slat body.

5. The improved slat as defined in claim 4 wherein said spacer insert includes an axial bore to receive the means for fastening the slat to the vehicle.

6. In a load-bearing slat for a vehicle luggage carrier having a slat body with a load-bearing wall, an insulator for preventing contact between the slat body and the vehicle, and means for fastening the slat to the vehicle, the improvement comprising:

a plurality of spacer inserts received within corresponding openings in a top surface of the insulator, said spacer inserts longitudinally spaced along the insulator and supporting the load-bearing wall of the slat body to maintain a spaced relationship between the load bearing wall and the insulator, said spacer inserts including vertically spaced apart locking flanges forming a groove therebetween, the edge of said opening in the insulator being received within said groove between said locking flanges to lockingly retain said spacer inserts within said openings of the insulator.

* * * * *